J. MARKWICK.
SPOKE SOCKET.
APPLICATION FILED OCT. 14, 1909.
947,390.
Patented Jan. 25, 1910.
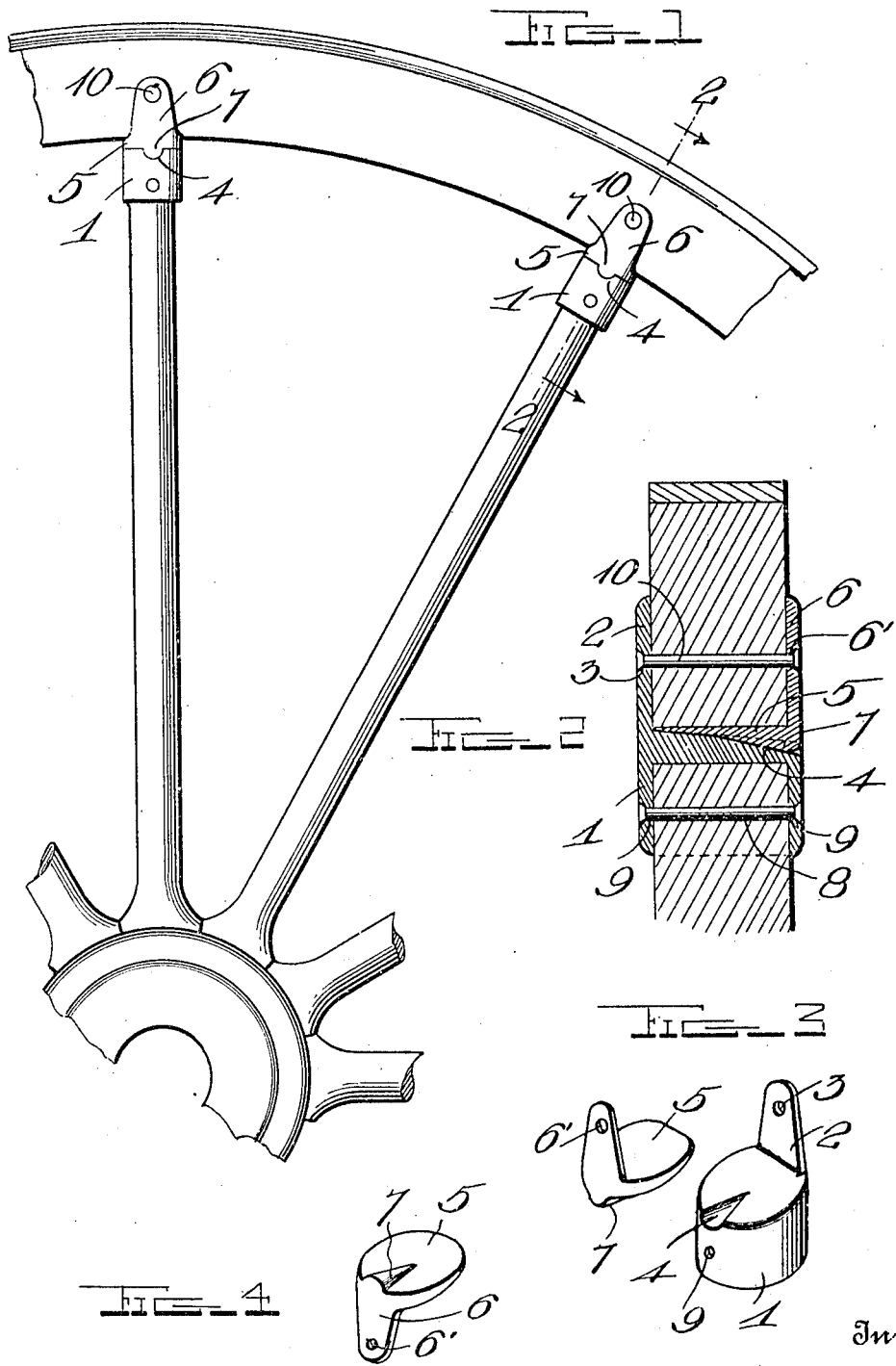
Witnesses
R. Clemker
C. H. Griesbauer.
Inventor
John Markwick
by H. B. Willson & Co
Attorneys

UNITED STATES PATENT OFFICE.

JOHN MARKWICK, OF SCRANTON, PENNSYLVANIA.

SPOKE-SOCKET.

947,390. Specification of Letters Patent. Patented Jan. 25, 1910.

Application filed October 14, 1909. Serial No. 522,642.

*To all whom it may concern:*

Be it known that I, JOHN MARKWICK, a citizen of the United States, residing at Scranton, in the county of Lackawanna and State of Pennsylvania, have invented certain new and useful Improvements in Spoke-Sockets; and I do declare the following to be a full, clear, and exact description of the invention, such as will enable others skilled in the art to which it appertains to make and use the same.

This invention relates to improvements in spoke sockets.

One object of the invention is to provide a spoke socket by means of which a broken spoke may be quickly and easily taken out of the wheel rim.

Another object is to provide a spoke socket of this character which will be simple, durable and inexpensive in construction, efficient and reliable in operation and well adapted to the purpose for which it is designed.

With these and other objects in view, the invention consists of certain novel features of construction, combination and arrangement of parts as will be more fully described and particularly pointed out in the appended claim.

In the accompanying drawings, Figure 1 is a side view of a portion of a wheel showing the application of the invention; Fig. 2 is a central vertical section on the line 2—2 of Fig. 1; Fig. 3 is a perspective view of the socket showing the parts separated; and, Fig. 4 is an inverted perspective view of the wedge portion of the socket.

My improved spoke socket comprises a spoke engaging member consisting of a tubular body portion or cap 1, closed at its outer end and having said closed outer end formed on an incline or at an oblique angle to the body portion. The body portion or cap 1, may be of any suitable shape to correspond with the cross-sectional shape of the spoke with which it is to be engaged.

On the closed outer end of the body portion or cap at one side of the same is formed a longitudinally extending rim engaging lug 2, in the outer end of which is formed a rivet or bolt hole 3. In the closed outer end of the cap or body portion of the socket member at the opposite side of the same from the lug 2, is formed an inwardly tapering groove or recess 4, the purpose of which will be hereinafter described.

Adapted to coöperate with the spoke member to secure the outer end of the spoke in place is a wedge and rim engaging member consisting of a wedge shaped plate 5, at one side of which is formed a longitudinally extending substantially right-angular rim engaging lug 6, which corresponds in size and shape to the rim engaging lug 2, of the spoke section and when in operative position is opposite to and in alinement with said lug 2. The lug 6, is provided with a rivet or bolt hole 6', disposed in line with the rivet or bolt hole 3, in the lug 2, when the parts are in operative position. The plate 5, of the rim engaging member preferably corresponds in size and shape to the closed outer end of the spoke member or cap of the socket with which end the plate is engaged when the parts are assembled. On the lower or inner side of the plate 5, adjacent to its outer edge is formed an inwardly tapering projection or lug 7, which, when the plate 5, is in engagement with the outer end of the cap 1, will fit into the groove or recess 4, thus forming an interlocking connection between said plate and the end of the cap, whereby the rim engaging member of the socket is held against lateral movement or displacement on the spoke member of the socket.

When the socket is arranged for use, the cap or body portion 1, is engaged with the outer end of a spoke and is preferably secured in place on said end by a bolt or rivet 8, which is passed through alined apertures 9, formed in the opposite sides of the body portion 1. The heads of the rivet 8, are preferably countersunk or lie flush with the outer sides of the body portion as shown. After the cap or body portion 1, has been engaged with the spoke, the inner end of the spoke is engaged with the hub in the usual or in any suitable manner, while the lug 2, on the cap 1, of the socket, is engaged with one side of the wheel rim. With the parts in this position, the wedge plate 5, of the rim engaging member is forced between the end of the cap member and the inner edge of the rim until the lug 6, on the plate 5, is in engagement with the adjacent side of the wheel rim and in a position directly opposite to the lug 2, on the cap. A hole is bored through the rim in alinement with the bolt or rivet holes in the outer ends of the lugs 2, and 6, and through said holes is inserted a bolt or rivet 10, the heads or ends of which are countersunk in the lugs and lie flush with the outer surface thereof.

By means of a socket constructed as herein shown and described, a broken spoke may be readily removed from the wheel and a new spoke inserted without removing the tire and rim, thus saving a great amount of time, labor, and expense.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention, what I claim is:

In a spoke socket, a spoke engaging member comprising a tubular body portion or cap having a closed outer end formed at an oblique angle to said body portion, a tapered recess in the end of said body portion, an apertured lug on the outer end of one side of the said body portion, a combined wedge plate and rim engaging member comprising a wedge shaped plate adapted to be driven between the outer end of said body portion and the adjacent edge of the wheel rim, a tapered lug formed on said wedge plate to engage the tapered recess in the end of the socket, an apertured rim engaging lug formed on said plate, a rivet arranged through the apertures in said lugs and through the wheel rim, and means to secure the cap or body portion in engagement with the end of the spoke.

In testimony whereof I have hereunto set my hand in presence of two subscribing witnesses.

JOHN MARKWICK.

Witnesses:
FREDERICK MARKWICK,
SARAH ANN MORGAN.